Feb. 18, 1969  B. H. PINCKAERS  3,428,784
MODULATING CONTROL APPARATUS
Filed Oct. 5, 1966
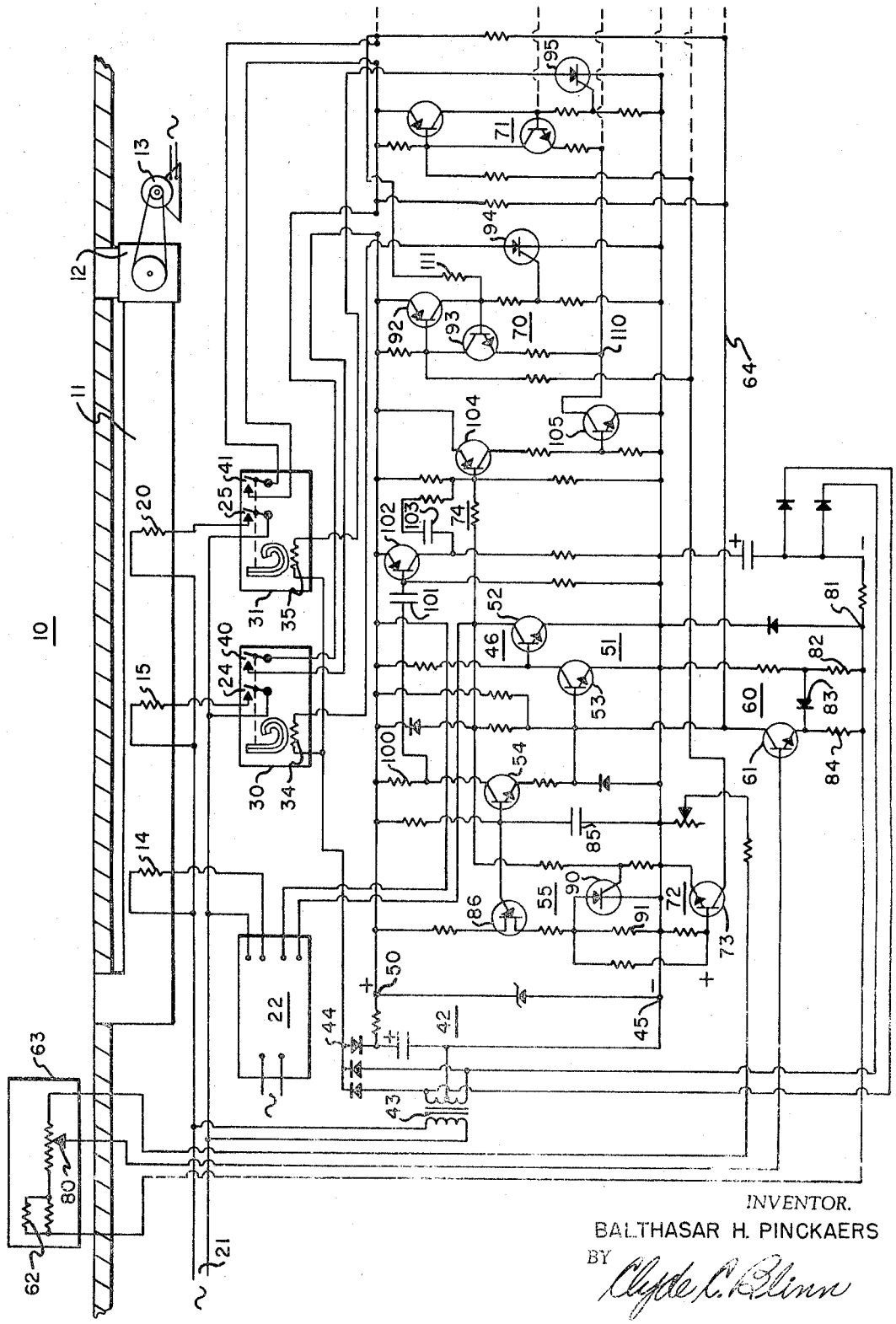
INVENTOR.
BALTHASAR H. PINCKAERS
BY
ATTORNEY

United States Patent Office 3,428,784
Patented Feb. 18, 1969

3,428,784
MODULATING CONTROL APPARATUS
Balthasar H. Pinckaers, Edina, Minn., assignor to Honeywell Inc., Minneapolis, Minn., a corporation of Delaware
Filed Oct. 5, 1966, Ser. No. 584,566
U.S. Cl. 219—486                 10 Claims
Int. Cl. H05b 1/02

The present invention is concerned with an improvement in a proportional or modulating control apparatus wherein a plurality of condition changing apparatuses are controlled by a ocndition responsive means to provide a proportional combined output of the condition changing apparatuses which varies from a low level to a high level in a modulating manner depending upon the need as sensed by a condition responsive means. In particular, the improvement makes use of a modulating controller for varying the output of a first condition changing means in a modulating manner from a low level to a high level and upon the first condition changing means having a high level output, further need for an increase in the condition results in energization of another condition changing means at the high level and the first condition changing means returns to a low level output, followed by modulation of the output of the first condition changing means as the need continues to increase as sensed by the conditon responsive means.

In the present invention, a solid state proportional or modulating controller is used to control a first electric heater in response to the output of a space thermostat between a low level and a high level of output in a modulating manner depending on the need for heat in the space. When the modulating controller is energizing the first electric heater at a high level, a further increase in the heating load as sensed by the thermostat results in the full energizing of a second electric heater and the first heater is de-energized to some low level.

If the need for heat is the space again increases as sensed by the thermostat, the modulating controller again increases the output of the first electric heater to the high level at which time a third electric heater is fully energized.

If the heating load had decreased, the second heater would have been de-energized when the first heater was fully de-energized.

With such an apparatus, the modulating controller is used to provide control of the total electric heating output from a low level to a high level in a modulating manner.

In the single figure, a schematic representation of the modulating control apparatus is shown with a modulating controller for a first heater and an on-off controller for each of the other heaters.

Referring to the single figure, space 10 is conditioned by supplying air to the space through a duct 11 by a fan 12 which is driven by a motor 13. Located in duct 11 are three condition changing means or electric heaters 14, 15 and 20 which, upon being energized, heat the air passing through the duct. Heater 14 is connected to a source of power 21 through a relay 22 which upon receiving an input signal energizes heater 14. Relay 22 is of a fast operating type for providing pulses of energization of heater 14 which vary in length depending upon the length of time the input signal is available. Heaters 15 and 20 are connected to source of AC power 21 by snap acting switches 24 and 25 of slow operating, time delay, type thermal relays 30 and 31, respectively, having bimetals connected to control the switches in response to the output of heaters 34 and 35. Relays 30 and 31 have additional switches 40 and 41 which are closed simultaneously with the switches 24 and 25, respectively.

The control apparatus has a DC source of power 42 which has a center tap transformer 43 having a primary winding connected to an AC source of power 21. Power source 42 has an unfiltered DC output between a positive terminal 44 and a negative terminal 45 and a filtered and regulated DC output between a positive terminal 50 and a terminal 45. A further filtered and regulated power source has a negative terminal 81 and a positive terminal 45.

A modulating controller 46 for controlling heater 14 in a pulsating manner provides a modulating heat output as the length of the "on" pulses and thus the total "on" time increases. The controller has a switching circuit 51 having an output transistor 52 connected to control the energization of relay 22. Switching circuit 51 is controlled by a summation of "on" and "off" bias currents for a transistor 53. A first pulsating "on" bias current is obtained from a transistor 54 energized by relaxation oscillator circuit 55. A second "off" bias current is obtained by a temperature responsive bridge network circuit 60 having a transistor 61 the collector current of which varies in response to the temperature of a condition responsive means or temperature responsive resistor 62 in a space thermostat 63. A third "on" bias current or signal is obtained from feedback conductor 64 when on-off controllers or switches 70 and 71 energize heaters 15 and 20 to modify the operation of the modulating controller. The third bias current has a first magnitude when only heater 15 is energized, and has a second magnitude when both heater 15 and heater 20 are energized.

When heater 14 is energized at a high level or "full on," a "turn on" circuit 72 is energized and a transistor 73 conducts to energize on-off controller 70 to energize heater 15. Upon heater 15 being energized, the feedback, or third "on" bias current to modulating controller 46 through conductor 64 when switch 40 closes, modifies the control point of the modulating controller so the heat output of heater 14 is reduced to a low level.

Upon a further increase in the heating load or drop in the space temperature, the modulating controller increases the heat output of heater 14. When the output of heater 14 again reaches "full on," "turn-on" circuit 72 energizes on-off controller 71 and heater 20. A feedback current through switch 41 and conductor 64 again resets the control point of the modulating controller and the output of heater 14 is reduced to a low level whereby upon an increase in heating load, the heat output of of heater 14 can be modulatingly increased to "full-on." While other on-off controllers can be added to control additional electric heaters, the energization of heaters 14, 15, and 20 provides a maximum heat output which was increased modulatingly from zero output.

When the heating load decreases to reduce the heat output of heater 14 to zero, a "turn-off" circuit 74 de-energizes controller 71 to turn off heater 20 and remove a portion of the feedback or third bias current to the modulating controller whereby heater 14 is energized at an intermediate level. Upon a further drop in heating load until heater 14 is de-energized, "turn-off" circuit 74 de-energizes heater 15, and the feedback to the modulating controller is completely removed.

OPERATION

Assuming that the various voltage sources including source 21 are available and the temperature in space 10 is at the temperature control point selected by the position of wiper 80, the "off" bias current for transistor 53, which flows from power terminal 45 through transistor 53 and transistor 61 of bridge network circuit 60 to power terminal 81 is small. The output of the bridge circuit 60 is maintained constant regardless of changes in ambient temperature by an ambient temperature compensating network comprising resistor 82, diode 83 and resistor 84 which changes the bias on transistor 61 as the ambient temperature of diode 83 varies.

The output current of transistor 54 (an "on" bias for transistor 53) is proportional to the ramp voltage of oscillator 55 which is produced by the charging of capacitor 85. The capacitor 85 discharges through the circuit including unijunction transistor 86 and silicon controlled rectifier (SCR) 90 which is normally biased conductive. As the output current of transistor 54 increases proportional to the cyclic ramp voltage of oscillator 55, transistor 53 is biased conductive at the beginning of each cycle of oscillator 55 which results in the de-energization of transistor 52 so that heater 14 is de-energized for the remaining part of the oscillator cycle.

As the temperature and the heating load of space 10 increase, the "off" bias current furnished by bridge circuit 60 increases and the repetitive "on" bias current furnished by transistor 54 must be larger on each cycle to overcome the bridge circuit "off" bias current. This results in an increase in the length of the "on" time of each cycle of heater 14 depending upon the space temperature.

When the heating load of space 10 increases to result in heater 14 being energized at a high level or "full on," the "on" bias to SCR 90 is not available at the end of the oscillator cycle as transistor 52 is conductive at the end of the cycle; therefore, capacitor 85 will discharge through the circuit including resistor 91 to provide a bias to "turn on" circuit 72 as transistor 73 is momentarily made conductive.

The conduction of transistor 73 turns on the on-off controllers 70 and 71, but since switch 40 of relay 30 is open, power terminal 50 is only effective to energize controller 70. The "turn on pulse" fires transistor 92 which has a holding circuit including transistor 93 and SCR 94 is biased conductive. Heater 34 is connected between power terminals 44 and 45 upon the energization of SCR 94 and after a short period of time switch 24 closes to energize heater 15 "full on."

Simultaneously, with the energization of heater 15, switch 40 closes to connect feedback conductor 64 to terminal 50 to provide a feedback "on" bias current to transistor 53 which modifies the control point of modulating controller 46 to reduce the "on time" or heat output of heater 14 to a lower value.

Upon a further increase in the heating load, the modulating controller increases the heat output of heater 14 until the "turn on" circuit 72 is again energized to turn on the on-off controller 71 which energizes SCR 95 to energize heater 20 "full on." An additional feedback "on" bias signal is available to transistor 53 when switch 41 closes to further modify the control point of the modulating controller to reduce the heat output of heater 14 to a lower value.

At the end of each cycle of oscillator 55, a "turn off" circuit 74 is energized. When transistor 54 is conducting, the current flow through resistor 100 produces a voltage to charge capacitor 101. When the oscillator 55 reaches the end of a cycle and transistor 54 stops conducting, capacitor 101 discharges through transistor 102 to momentarily render that transistor nonconductive and capacitor 103 charges by being connected between terminals 50 and 45. Subsequently, at the beginning of the next oscillator cycle, capacitor 103 discharges to provide an "off" bias for transistor 104. Transistor 104 is normally biased "on" by the summation of several currents, one being the current flow through transistor 52; therefore, if transistor 52 is conductive at the beginning of the next cycle, the opposing "off" bias provided by capacitor 103 discharging is not large enough to overcome the "on" bias provided by conduction of transistor 52 and transistor 104 remains conductive to maintain transistor 105 conductive. If the modulating controller has turned heater 14 off and transistor 52 is nonconductive at the beginning of the cycle of oscillator 55, the momentary "off" bias provided when capacitor 103 discharges biases transistor 104 nonconductive to open the circuit between conductor 110 and power terminal 45 through transistor 105 to de-energize on-off controllers 70 and 71. Since switch 41 is slow to open even though controller 71 has de-energized heater 35, when transistor 105 is again conducting, controller 70 is again turned on by a feedback circuit through switch 41 and resistor 111. After relay 31 cools, heater 20 is de-energized and upon the removal of the feedback "on" bias current through switch 41 and conductor 64 to transistor 53, modulating controller 46 is modified to a higher level of output of heater 14.

A further reduction of the heating load in space 10 results in the decrease of heat output of heater 14 of zero and controller 70 de-energizes heater 15. When the space thermostat 63 is satisfied, the heat output of all heaters is reduced to zero.

Since the "turn on" circuit 72 energizes the on-off controllers or heaters 15 and 20 "full on" when heater 14 is energized "full on" and the "turn off" circuit 74 de-energizes heaters 15 and 20 when heater 14 is "full off," the "on" feedback bias for conductor 64 to transistor 53 is used to prevent an oscillatory operation. The size of heater 14 is larger than heater 15 and 20, such as 7.5 kw. for heater 14 and 5.0 kw. for heaters 15 and 20. When heater 14 is "full on" and heater 15 is energized, the feedback bias current resets the modulating controller to a lower heat output such as 2.5 kw. which is a 5.0 kw. reset. When the modulating controller de-energized heater 14 to zero output and heater 15 is thus de-energized, the modulating controller is reset to increase the heat output of heater 14 to 5.0 kw. As the load changes, the total heat output of heaters 14, 15 and 20 can be modulated smoothly between zero heat with all heaters de-energized and full heat with all heaters fully on.

The embodiments of the invention in which an exclusive property or right is claimed are defined as follows:

1. Modulating control apparatus for use in controlling a plurailty of condition changing means under the control of condition responsive means, the modulating control apparatus comprising:

modulating controller means adapted to energize a first condition changing means, means adapted to connect the condition responsive means to control said modulating controller means to vary an output of the first condition changing means in a modulating manner from a low level to a high level.

on-off controller means adapted to energize a second condition changing means, connection means connecting said modulating controller means to said on-off controller means to control said on-off controller means to energize the second condition changing means when said modulating controller means energizes the first condition changing means at the high level of output, and means to modify said modulating controller means to produce a predetermined level of output of the first condition changing means when the second condition changing means is energized.

2. The modulating control apparatus as defined in claim 1 wherein said means connecting said modulating controller means to said on-off controller means is adapted to de-energize said second condition changing means when said modulating controller means decreases the energization of said first condition changing means to said low level of output.

3. The modulating control apparatus as defined in claim 2 wherein said means to modify is removed when said on-off controller means de-energizes the second condition changing means to provide a high level output of the first changing means.

4. The modulating control apparatus defined in claim 3 for use with three condition changing means comprising;
 second on-off controller means adapted to energize a third condition changing means,
 connection means connecting said modulating controller means to said second on-off controller means, and
 means for preventing energization of said second on-off controller until said first on-off controller means is energized and said modulating controller means reaches said high level of output of the first condition changing means after modulating the first condition changing means from the predetermined level of output to the higher level of output.

5. The modulating control apparauts defined in claim 4 comprising;
 means for preventing de-energization of the second condition changing means when said modulating controller means reaches said low level of output of the first condition changing means until said second on-off controller means has deenergized the third condition changing means and said modulating controller means has decreased the output of the first condition changing means from the high level to the low level.

6. The modulating control apparatus as defined in claim 4 wherein the condition changing means are electric heating loads furnishing heat to a space and the condition responsive means is a temperature responsvie element responsive to the temperature in the space whereby the total heat supplied to the space can be controlled in a modulating manner from the low level to a high level to include the energization of the loads energized by said on-off controller means and the energization of the load energized by said modulating controller means at a high level.

7. The modulating control apparatus as defined in claim 1 wherein the modulating controller means comprises a cyclically operating switching circuit adapted for varying the closed circuit time of the first condition changing means proportional to the effect of the condition responsive means and said means connecting said modulating controller to said on-off controller comprises circuit means responsive to the closed circuit time of said switching circuit whereby when said modulating controller means has a maximum "on time," said on-off controller means is adapted to energize the second condition changing means.

8. The modulating control apparatus defined in claim 7 wherein circuit means is responsive to the open circuit time of said switching circuit to de-energize said on-off controller means when the open circuit time of said switching circuit reaches a minimum value.

9. The modulating control apparatus as defined in claim 4 wherein upon said first on-off controller means being energized, circuit means is provided for said second on-off controller means whereby upon said modulating controller means subsequently reaching said high level of output of the first condition changing means said second on-off controller is energized.

10. In the modulating control apparatus of claim 8 wherein said means to modify is adapted to change the output of the first condition changing means by an amount less than the total ouptut of the first condition changing means.

References Cited

UNITED STATES PATENTS

| 2,993,106 | 7/1961 | Maudlin et al. | 219—486 |
| 3,134,006 | 5/1964 | Dorsman | 219—483 |
| 3,130,319 | 4/1964 | Burley | 307—29 |

BERNARD A. GILHEANY, *Primary Examiner.*

F. E. BELL, *Assistant Examiner.*